US007908079B1

(12) United States Patent

Dabney et al.

(10) Patent No.: US 7,908,079 B1

(45) Date of Patent: Mar. 15, 2011

(54) PORTABLE RUNWAY INTERSECTION DISPLAY AND MONITORING SYSTEM

(75) Inventors: Richard W. Dabney, Tanner, AL (US); Susan Vinz Elrod, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1213 days.

(21) Appl. No.: 11/527,658

(22) Filed: Sep. 18, 2006

(51) Int. Cl.

| | |
|---|---|
| ***G06F 19/00*** | (2006.01) |
| ***G06G 7/70*** | (2006.01) |
| ***G08G 1/00*** | (2006.01) |

(52) U.S. Cl. .............. 701/120; 701/1; 701/17; 701/121; 701/122

(58) Field of Classification Search ........................ None
See application file for complete search history.

(56) References Cited

U.S. PATENT DOCUMENTS

| | | | | |
|---|---|---|---|---|
| 3,878,506 | A | 4/1975 | Young | |
| 5,519,618 | A | 5/1996 | Kastner et al. | |
| 6,168,294 | B1 | 1/2001 | Erni et al. | |
| 6,571,167 | B2 * | 5/2003 | Schmidt | 701/120 |
| 6,636,721 | B2 * | 10/2003 | Threadgill et al. | 455/12.1 |
| 6,920,390 | B2 * | 7/2005 | Mallet et al. | 701/120 |
| 2004/0174597 | A1 * | 9/2004 | Craig et al. | 359/484 |
| 2004/0216343 | A1 * | 11/2004 | Golding | 40/564 |

* cited by examiner

*Primary Examiner* — Khoi Tran
*Assistant Examiner* — Bhavesh V Amin
(74) *Attorney, Agent, or Firm* — Michael G. Smith; James J. McGroary

(57) ABSTRACT

Systems, methods and apparatus are provided through which an apparatus located on an airfield provides information to pilots in aircraft on the ground and simultaneously gathers information on the motion and position of the aircraft for controllers.

24 Claims, 11 Drawing Sheets

800

PORTABLE RUNWAY INTERSECTION DISPLAY AND MONITORING SYSTEM

ORIGIN OF THE INVENTION

This invention was made by an employee of the United States Government and may be manufactured and used by or for the Government for governmental purposes without the payment of any royalties.

FIELD OF THE INVENTION

This invention relates generally to navigation and control of vehicles, and more particularly to airport runway lighting and air traffic control.

BACKGROUND OF THE INVENTION

Runway incursions are dangerous events at airports. Runway incursions involve an aircraft, vehicle, person, or object on the ground that creates a collision hazard or results in a loss of separation with an aircraft taking off, intending to take off, landing, or intending to land. 60% of runway incursions are caused by pilot deviations, 19% are caused by vehicle/pedestrian deviations, and 21% of runway incursions are caused by controller operational errors. The incursion rate has grown fairly steadily from 0.3 incidents per 100,000 operations in 1988 to 0.64 in 2000.

Runway incursions most often occur when a pilot or ground vehicle operator either becomes disoriented or distracted and when the pilot or ground vehicle operator does not realize that the pilot or ground vehicle operator is about to enter an active runway. Conventional non-interactive airport signage does not provide any confirmation that the pilot/driver has arrived at the correct intersection, or any stop/go signal to let him know whether it is safe to proceed and that he is or is not authorized to do so. Noisy and congested radio frequencies or defective communications equipment sometimes results in important verbal ATC instructions being misunderstood or not heard at all. At large airports controllers are often overworked and do not have time to visually monitor the movement of all aircraft on the airport surface, and some incursions go undetected until a dangerous situation has been created. At night or in bad weather these problems are worsened by reduced visibility, which increases the probability of distraction or disorientation. Most large airports allow operations under Instrument Flight Rules (IFR) with visibilities as little as a quarter mile, conditions under which many aircraft on the ground will not even be visible from the tower. Thus, the controller is often forced to take the pilot's word for it that he is at the proper intersection. Many medium sized airports do not employ a separate ground controller at night, increasing the chances that an incursion can go undetected by an overworked tower controller distracted by simultaneous arriving aircraft, important phone calls, or other stressful circumstances. Finally, most of the recent conventional airport surface movement monitoring and signage systems that have been developed or proposed either utilize complex and expensive technologies (such as surface detection radar) or require disruptive excavation activities (for hardwired enhanced signage) during the installation process. These systems have therefore not been widely adopted because airport operators either cannot afford them or do not want to shut down all or part of the airport for installation.

The two greatest disadvantages of the conventional runway incursion prevention systems are the expense and disruptiveness of acquisition and installation of the equipment, plus the ambiguity and uncertainty introduced by the human interpretation factor associated with radar and enhanced vision systems. For example, the Airport Movement Area Safety System (AMASS) has no way of knowing the intent of an aircraft or vehicle approaching a runway from an intersecting taxiway, so the FAA turned off AMASS' warning capability for "side-impact" collision threats because the frequent nuisance alerts would have desensitized controllers to AMASS alerts). The FAA modified AMASS to look at single runways and ignore potential side-impact collisions. The Airport Surface Detection Equipment-Model X (ASDE-X) was intended to be a low-cost ground radar and warning system for medium-sized airports but appears now to have a lifecycle cost of about $13 million per unit. The Runway Status Light (RWSL) system is a system of lights automatically controlled through the use of surface radar data and is to be used in conjunction with surveillance data from Airport Surface Detection Equipment-Model 3 (ASDE-3) and other airport radar indicators. A prototype of the RWSL system was installed at Boston's Logan International Airport in 1995, and showed great promise but was cancelled possibly because the technology that was available at the time to control the light status was inadequate. The Runway Safety Monitor (RSM) provides single stage alerts; and the RSM requires software that derives three-dimensional invisible zones. Runway Incursion Prevention System (RIPS) requires updates to the ASD-B (Automated Dependent Surveillance-Broadcast) systems. RIPS is a component of NASA's AvSP (Aviation Safety Program)

Other conventional systems include the Synthetic Vision System (SVS) and the Hold Short Advisory Landing Technology (HSALT).

U.S. Pat. No. 6,168,294 describes an airport taxi signal light having a LED light array with light processing assembly and dichroic filter. U.S. Pat. No. 5,519,618 describes an airport surface safety logic, and U.S. Pat. No. 3,878,506 describes airport lighting and radar reflector combination. However, the technology described in these patents lack versatility.

Manufacturers of traditional airport taxiway lighting systems are Honeywell, Hali-Brite Inc., Raytech, Crouse Hinds, and OCEM. The Federal Aviation Administration and National Transportation Safety Board are useful government point of contacts for specification information regarding systems currently in use for runway incursion prevention. Aviation industry organizations that are interested in runway incursion prevention and airport improvement include the National Business Aircraft Association, Aircraft Owners and Pilots Association, and Airline Pilots Association.

For the reasons stated above, and for other reasons stated below which will become apparent to those skilled in the art upon reading and understanding the present specification, there is a need in the art for a runway incursion detection system that is versatile. There is also a need for an airport surface movement monitoring and signage systems that works without interaction from a ground controller and that do not require complex and expensive technologies or disruptive excavation activities.

There is a also a need in the prior art for all-weather day/night aircraft/vehicle position monitoring, unambiguous pilot/operator signaling and warning, and low-cost non-disruptive facilities installation and operation that is provided by a system that is designed for simplicity, with no expensive ground radar stations or sophisticated software algorithms involved. There is also a need to reduce additional involvement from air traffic control personnel as well as to provide a portable and low cost runway incursion prevention system, in order to encourage widespread implementation of runway incursion detection systems and thus improve aircraft safety.

BRIEF DESCRIPTION OF THE INVENTION

The above-mentioned shortcomings, disadvantages and problems are addressed herein, which will be understood by reading and studying the following specification.

The description below provides all-weather day/night aircraft/vehicle position monitoring, unambiguous pilot/operator signaling and warning, and low-cost non-disruptive facilities installation and operation. The description below also provides an airport taxi system that is designed for simplicity, with no expensive ground radar stations or sophisticated software algorithms involved. The description below additionally minimizes or eliminates the need for additional involvement from air traffic control as well as provides a portable and low cost runway incursion prevention system.

In one aspect, a portable airport taxi lighting system is controlled via radio signals by the airport tower or some other control center. In some embodiments, the signals are encrypted to prevent sabotage. The portable airport taxi lighting system can be powered by either solar power with a backup battery system or by electrical coupling to existing blue night taxiway lights for direct power at night and for recharging the backup battery system for day use.

In another aspect, safety features include a confirmation signal, provided to the tower that monitors and reports the pilot's actions, and a watchdog signal that provides health and status of the lighting system to the tower.

In yet another aspect, a carrier current communication link between the control center and the portable airport taxi lighting system uses existing taxiway lighting circuits to command and monitor the portable airport taxi lighting system. The carrier current communication link can be implemented as an alternative to the radio signal implementation to avoid or reduce RF interference between the portable airport taxi lighting system and the control center.

In still another aspect, a runway incursion detection system with an integrated short-range radar or video system provides automatic detection and verbal warning of clearance violators using the existing ground frequencies.

In still yet another embodiment, an integrated solar power source with a storage battery backup provides portability and easy enhancement of the runway incursion detection system that is helpful when airports are undergoing modifications and/or experiencing emergencies. The portability, enhanceability, and compactness of the system increases cost-effectiveness of the runway incursion detection system.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into four sections. In the first section, apparatus embodiments are described. In the second section, embodiments of methods are described. In the third section, the hardware and the operating environment in conjunction with which embodiments may be practiced are described. Finally, in the fourth section, a conclusion of the detailed description is provided.

Overview

Figure 1:
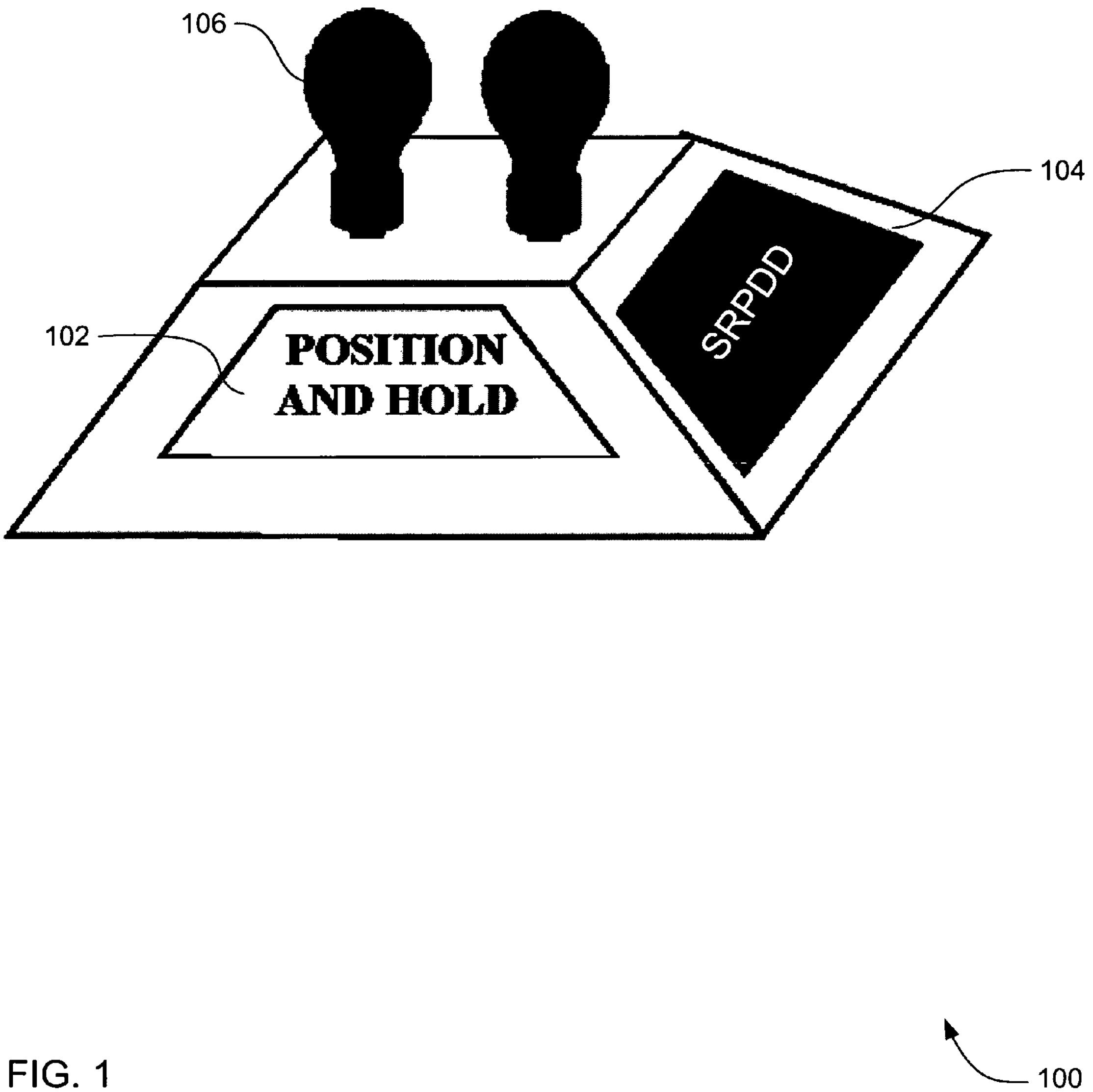
FIG. 1 is a perspective view block diagram of a runway intersection display and monitor (RIDAM) unit according to an embodiment.

FIG. 1 is a perspective view block diagram of a runway intersection display and monitor (RIDAM) unit according to an embodiment. RIDAM 100 solves the need in the art for a low cost runway incursion prevention system that in turn encourages widespread implementation of runway incursion detection systems and thus improves aircraft safety and RIDAM 100 solves the need in the prior art for a portable and expandable airport signage that operates without interaction from a ground controller and that does not require complex and expensive technologies or disruptive excavation activities. The RIDAM is also suitable for use adjacent to airport pathways other than runways, such as taxiways. All of these improvements provide for a versatile airport surface movement monitoring and signage system.

The RIDAM unit 100 includes one or more alphanumeric display 102, In some embodiments, the alphanumeric display 102 provides "Stop/Go" signals as well as displays short alphanumeric text messages to aircraft awaiting further clearance. The alphanumeric display 102 operates without interaction from a ground controller.

RIDAM 100 includes one or more short range proximity detection devices (SRPDD) 104. Low cost of a RIDAM 100 that includes a SRPDD 104 provides a low cost runway incursion prevention system that in turn encourages widespread implementation of runway incursion detection systems and thus improves aircraft safety.

The purpose of RIDAM unit 100 is to reduce the frequency of airport runway incursions through improved aircraft/vehicle positional awareness, communications and surveillance.

The RIDAM unit 100 is portable and expandable, which is helpful in rapid deployment when airports are modified or augmented.

The alphanumeric display 102 is prominently mounted on the front surface of the RIDAM unit 100, and is of sufficient size, brightness and resolution that simple air traffic control (ATC) text messages, such as HOLD, PROCEED, CLEARED, RETURN, or other messages to be determined, can be clearly read by operators of aircraft or vehicles waiting for clearance at the intersection. The alphanumeric display 102 is composed of energy efficient material so that power usage by the RIDAM unit 100 is minimized. Suitable display technologies meeting these requirements include but are not limited to light emitting diodes and plasma screens.

In some embodiments, the alphanumeric display 102 is augmented by simple red/green stop/go signal lights (106 and 108) mounted atop the RIDAM unit 100; the lights 106 and 108 provide universal familiarity to everyone with the associated meanings of the lights 106 and 108, and provide backup clearance functionality as well.

The design of the RIDAM 100 is modular in function and form, so that optional components can be easily added to specific units as needed without having to remove the optional components from service. FIGS. 3-6 below show embodiments of RIDAM 100 in various embodiments including optional components.

The portability, enhanceability, and compactness of the system lends itself to unprecedented cost effectiveness as means of controlling and monitoring airport ground movements and reducing the runway incursion rate. Replacement of existing runway intersection signage with the RIDAM 100 will result in a further improvement in the safety and efficiency of aviation operations.

Enhancements are also possible which would make RIDAM 100 more suitable for use in locations where inclement weather is common and for emergency use in areas of natural disaster. A snow removal device, such as a blower or heater attached in proximity to the surfaces of the unit containing the displays would prevent obscuration of the text message display and prevent loss of power due to obstruction of sunlight from the solar panels. For military use or in rapid deployment to areas of natural disaster, a ruggedized version containing higher capacity batteries, shock-resistant internal components, shatterproof glass shields over the displays and solar panels, and a waterproof enclosure would enable the units to survive rough handling and flooding with minimal maintenance.

The components are electrically coupled though electrical control circuitry (not shown), such as a processor. While the RIDAM 100 is not limited to any particular alphanumeric display 102, short range proximity detection devices (SRPDD) 104, and signal lights 106 and 108, for sake of clarity a simplified alphanumeric display 102, SRPDD 104, and signal lights 106 and 108, are described.

RIDAM 100 solves the need in the art for an airport surface movement monitoring and signage systems that works without interaction from a ground controller and that does not require complex and expensive technologies or disruptive excavation activities.

Figure 2:
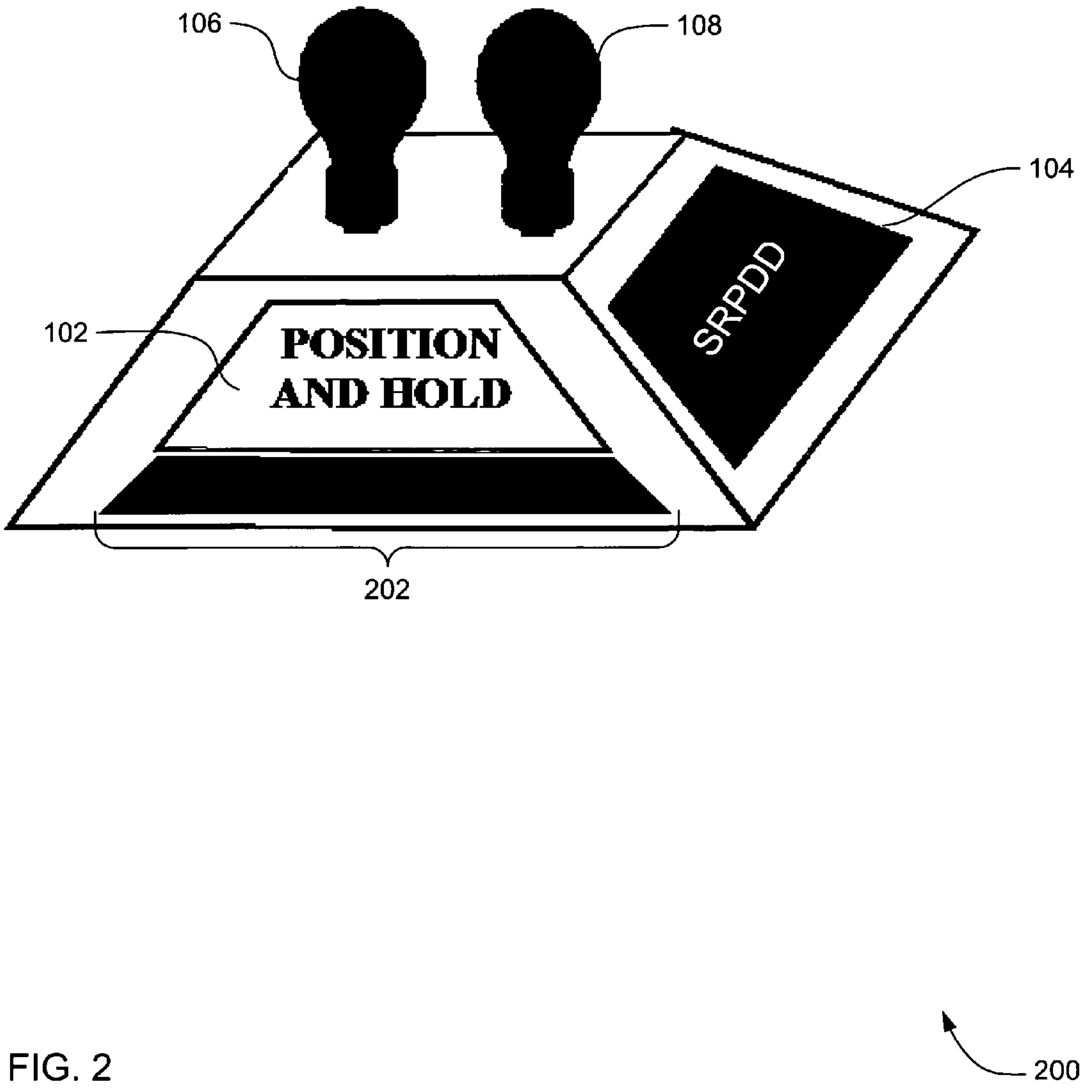
FIG. 2 is a perspective view block diagram of a runway intersection display and monitor (RIDAM) unit according to an embodiment that includes a solar panel.

FIG. 2 is a perspective view block diagram of a runway intersection display and monitor (RIDAM) unit according to an embodiment that includes a solar panel. RIDAM 200 solves the need in the art for a low cost runway incursion prevention system that in turn encourages widespread implementation of runway incursion detection systems and thus improves aircraft safety and RIDAM 200 solves the need in the prior art for a portable and expandable airport signage which is helpful in rapid deployment when airports are modified or augmented, and/or during emergencies when traditional hardwired lighting and signage may be inoperative due to damage or power outages and that operates without interaction from a ground controller and that does not require complex and expensive technologies or disruptive excavation activities. The RIDAM is also suitable for use adjacent to airport pathways other than runways, such as taxiways.

The RIDAM unit 200 includes one or more alphanumeric displays 102, and one or more solar energy panels 202 and a backup battery. Multiple solar panels can be mounted at as many locations (e.g. faces) as possible on the RIDAM to reduce the chances of battery depletion during a long run of cloudy days. The exact placement, size and number of solar panel(s) 202 is a design tradeoff between the placement, size and number of the alphanumeric display(s) 102. For example, bigger easier-to-read alphanumeric display(s) 202 versus total area of the solar panel(s) 202. The design tradeoff can vary between different operating environments. For example, smaller solar arrays are better in sunny Florida or Arizona, but not in cloudy Seattle. In contrast, for a permanent hardwired installation, no solar panels are needed at all, so display can be full-face.

RIDAM 200 includes one or more short range proximity detection devices (SRPDD) 104. In some embodiments, the alphanumeric display 102 is augmented by simple red/green stop/go signal lights (106 and 108) mounted atop the RIDAM unit 200; the lights 106 and 108 provide the advantage of universal familiarity to everyone with the associated meanings of the lights 106 and 108, and provide backup clearance functionality as well.

The RIDAM unit 200 is portable and expandable, which is helpful in rapid deployment when airports are modified or augmented, and/or during emergencies when traditional hardwired lighting and signage may be inoperative due to damage or power outages.

The portability, enhanceability, and compactness of the system lends itself to unprecedented cost effectiveness as means of controlling and monitoring airport ground movements and reducing the runway incursion rate. Replacement of existing runway intersection signage with the RIDAM 200 will result in a further improvement in the safety and efficiency of aviation operations.

Enhancements are also possible which would make RIDAM 200 more suitable for use in locations where inclement weather is common and for emergency use in areas of natural disaster. A snow removal device, such as a blower or heater attached in proximity to the surfaces of the unit containing the displays and solar panels, would prevent obscuration of the text message display and prevent loss of power due to obstruction of sunlight from the solar panels. For military use or in rapid deployment to areas of natural disaster, a ruggedized version containing higher capacity batteries, shock-resistant internal components, shatterproof glass shields over the displays and solar panels, and a waterproof enclosure would enable the units to survive rough handling and flooding with minimal maintenance.

The components are electrically coupled though electrical control circuitry (not shown), such as a processor. While the RIDAM 200 is not limited to any particular alphanumeric display 102, stop/go signal light 202, short range proximity detection devices (SRPDD) 104, and signal lights 106 and 108, for sake of clarity a simplified alphanumeric display 102, stop/go signal light 202, SRPDD 104, and signal lights 106 and 108, are described.

RIDAM 200 solves the need in the art for an airport surface movement monitoring and signage systems that works without interaction from a ground controller and that does not require complex and expensive technologies or disruptive excavation activities.

The design of the RIDAMs 100 and 200 are modular in function and form, so that optional components can be easily added to specific units as needed without having to remove the optional components from service. FIGS. 3-6 below show embodiments of RIDAM 200 in various embodiments including optional components.

APPARATUS EMBODIMENTS

In the previous section, system level overviews of the operation of two embodiments are described. In this section, particular apparatus of those two embodiments are described by reference to a series of diagrams.

Figure 3:
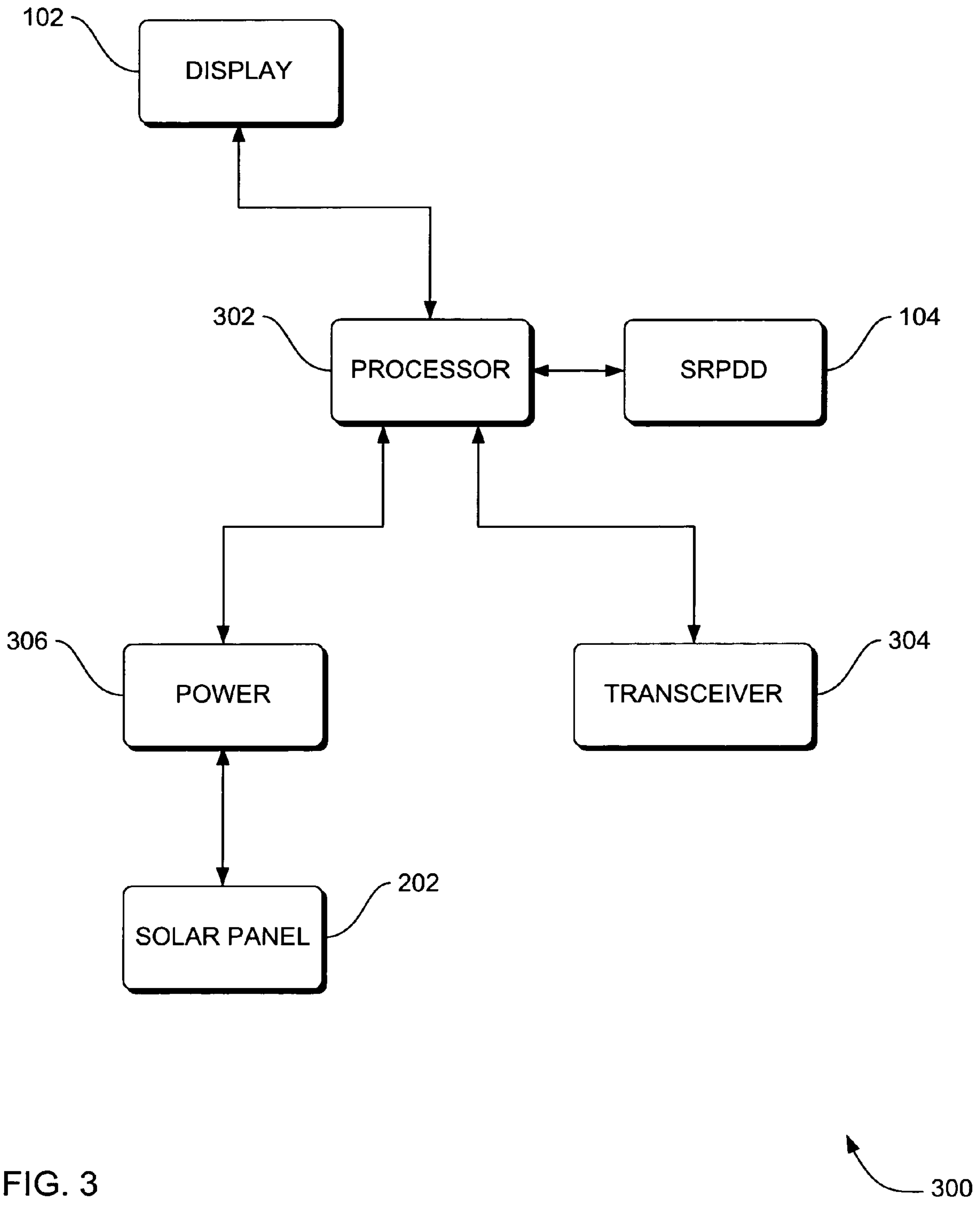
FIG. 3 is a schematic block diagram of a RIDAM unit according to an embodiment that includes a digital radio-frequency (RF) communications transceiver.

FIG. 3 is a schematic block diagram of a runway intersection display and monitor (RIDAM) unit 300 according to an embodiment that includes a digital radio-frequency (RF) communications transceiver. RIDAM unit 300 solves the need in the art for portability and ease of installation while preventing accidental or intentional interference, for reduced complexity and less expensive technologies with little or no disruptive excavation activities.

The RIDAM unit 300 includes at least one alphanumeric display 102, at least one solar panel 202, at least one pair of stop/go signal lights 106 and 108, one or more short range proximity detection devices 104, a command and telemetry processor 302, one or more digital radio-frequency (RF) communications transceivers 304, and one or more power management units 306.

In some embodiments the digital RF communications transceiver 304 provides command, telemetry, and status transmission between RIDAM units and the control tower. The digital RF communications transceiver 304 uses an encrypted signal format to reduce the risk of intentional or accidental interference, and has the ability to coordinate a mutual frequency change with the tower if persistent interference is detected. In some embodiments of the digital RF communications transceiver 304, spread-spectrum and pulse code modulation are implemented.

In some embodiments, conventional integrated circuits used in modern cellular phones and cable modems are utilized in the design of the digital RF communications transceiver in a very cost-effective manner. The conventional circuitry helps reduce cost of RIDAM 300, thus RIDAM 300 solves the need in the art for a low cost runway incursion prevention system, in order to encourage widespread implementation of runway incursion detection systems and thus improve aircraft safety Thus, RIDAM unit 300 is a portable airport taxiway intersection signage and lighting system that is radio controlled by the tower utilizing encrypted radio signals to achieve portability and ease of installation while preventing accidental or intentional interference.

In some embodiments, the power management unit 306 includes external power inputs from both a solar powered source 202 and an internal backup, and/or by plugging into the existing blue night taxiway light electrical system for use at night and for recharging batteries for day use. The power management unit 306 contains circuitry to convert the solar power and existing taxiway light source inputs to the voltages required to maintain a proper charge level in the unit's internal battery. When the RIDAM 300 is in operation and external power is not available, the power management unit 306 can draw power from the battery to operate the various functional subsystems, converting voltage levels and providing electrical filtering as required. Thus, RIDAM 300 solves the need in the art for an airport surface movement monitoring and signage systems that works without interaction from a ground controller and that does not require complex and expensive technologies or disruptive excavation activities.

In some embodiments, the power management unit 306 also receives input from the air traffic control tower interface processor as to which modes of operation are desired and switches power on or off to various subsystems as necessary.

RIDAM 300 can permanently replace or augment the existing runway designator signs using dedicated underground power and control circuits similar to those currently in use for conventional lighting and signage systems, especially at newly constructed landing facilities desiring improved runway incursion avoidance.

Figure 4:
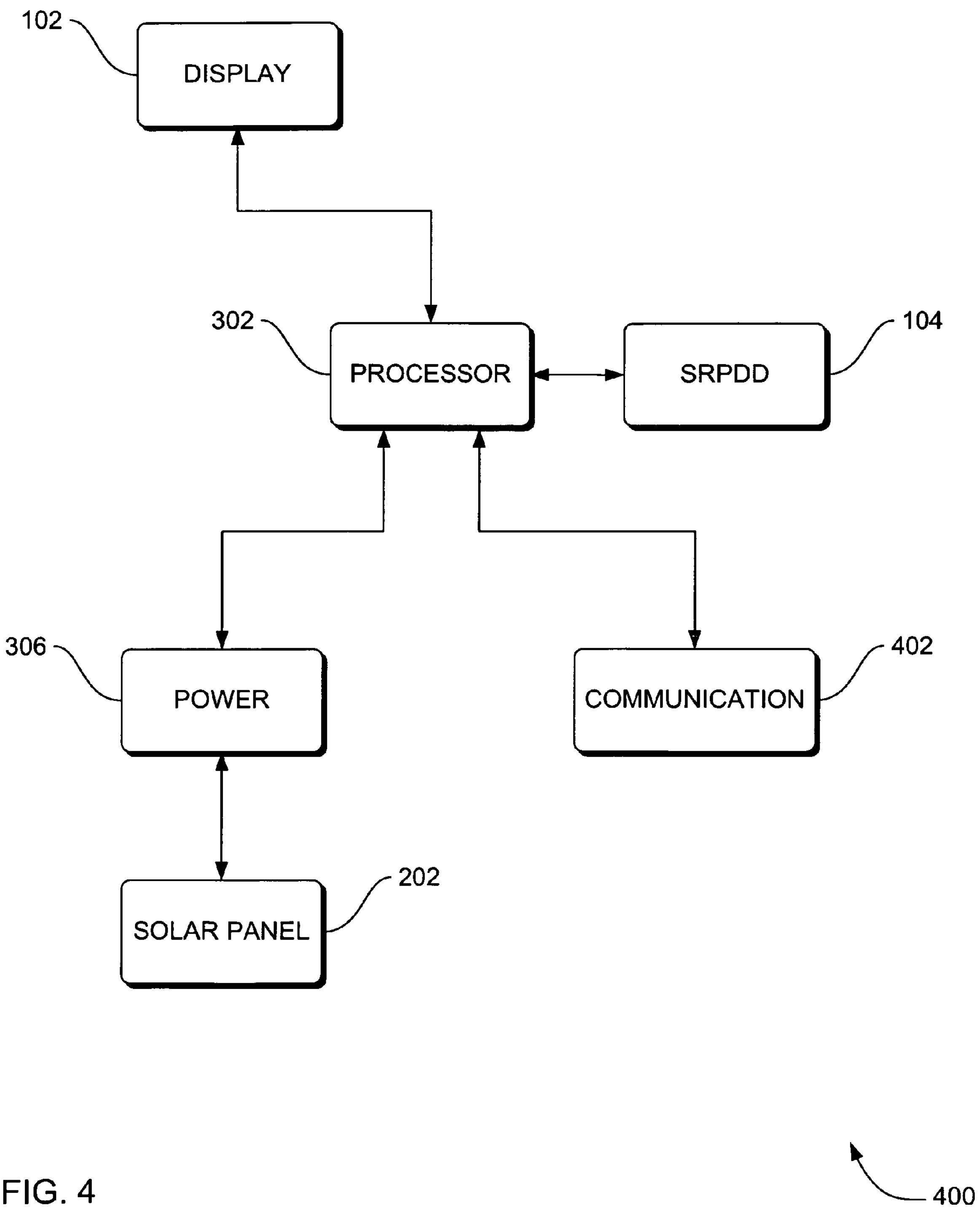
FIG. 4 is a schematic block diagram of a RIDAM unit according to an embodiment that includes a carrier-current communications component.

FIG. 4 is a schematic block diagram of a runway intersection display and monitor (RIDAM) unit 400 according to an embodiment that includes a carrier-current communications component. RIDAM unit 400 solves the need in the art to for an aircraft communication system that is low-cost and non-disruptive to facilities during installation and that provides simple operation, with no expensive ground radar stations or sophisticated software algorithms involved.

The RIDAM unit 400 includes at least one alphanumeric display 102, at least one solar panel 202, at least one pair of stop/go signal lights 106 and 108, one or more short range proximity detection devices 104, a command and telemetry processor 302, a carrier-current communications component 402, and a power management unit 306.

The carrier-current communications component 402 uses encrypted digital modulation techniques to send command and telemetry signals through power lines that serve the RIDAM unit 400. Communicating through the power lines provides an additional layer of security compared to over-the-air RF links without requiring any special wiring be installed. Communicating through the power line is very similar to the "Broadband over Power Line" technology recently approved by the Federal Communications Commission for providing Internet service to remote areas and therefore most of the components being developed for this new service will be applicable to the RIDAM carrier-current system design implementation.

A "carrier current" communication link between the RIDAM 400 and a control center provides a means of commanding and monitoring the RIDAM 400 for use in areas when interference to RF communications would likely be a problem but existing taxiway lighting circuits are available. The "carrier current" communication link is a hardwired circuit that provides near-complete immunity from accidental or intentional interference plus reduced complexity and higher reliability of associated interface circuitry. Higher bandwidths of data transfer are also possible with hardwired circuits, which may be important if simultaneous video images of aircraft at all intersections being monitored by RIDAM's are to be viewed by personnel in the control center. Fiber optics or coaxial cables can implement the hardwired circuit to provide high bandwidth and interference shielding.

Figure 5:
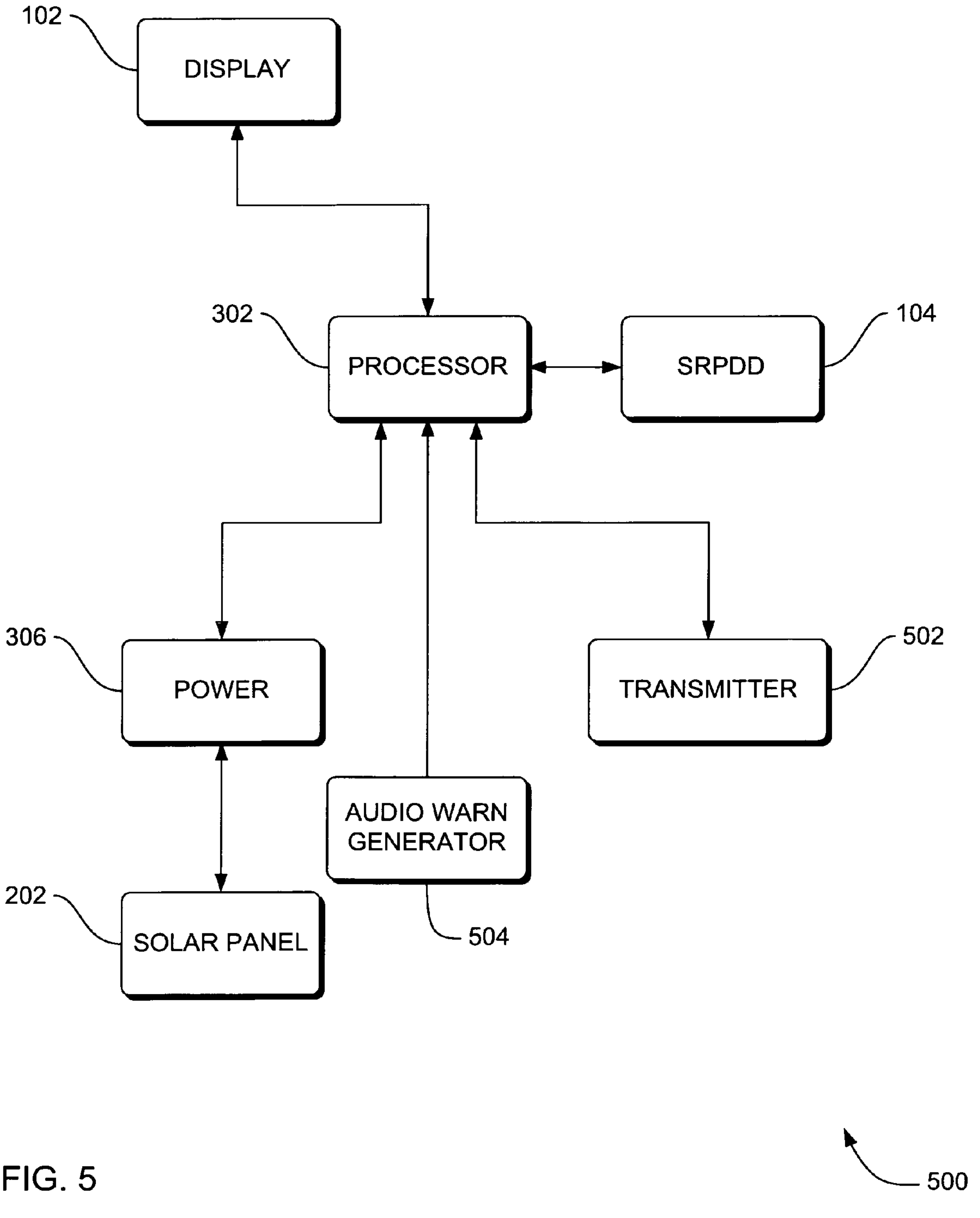
FIG. 5 is a schematic block diagram of a RIDAM unit according to an embodiment that includes an audio warn generator.

FIG. 5 is a schematic block diagram of a runway intersection display and monitor (RIDAM) unit 500 according to an embodiment that includes an audio warning generator. RIDAM unit 500 solves the need in the art to reduce additional involvement from air traffic control personnel.

The RIDAM unit 500 includes at least one alphanumeric display 102, at least one solar panel 202, at least one pair of stop/go signal lights 106 and 108, one or more short range proximity detection devices 104, a command and telemetry processor 302, a power management unit 306, one or more short range aviation band transmitters (SRAVT) 502 and one or more audio warning generators 504.

In some embodiments, the audio warning generator 504 generates audible warnings to potential clearance violators that can be automatically broadcast over the existing ground frequencies by short-range aviation band transmitters included in the RIDAM 500.

Figure 6:
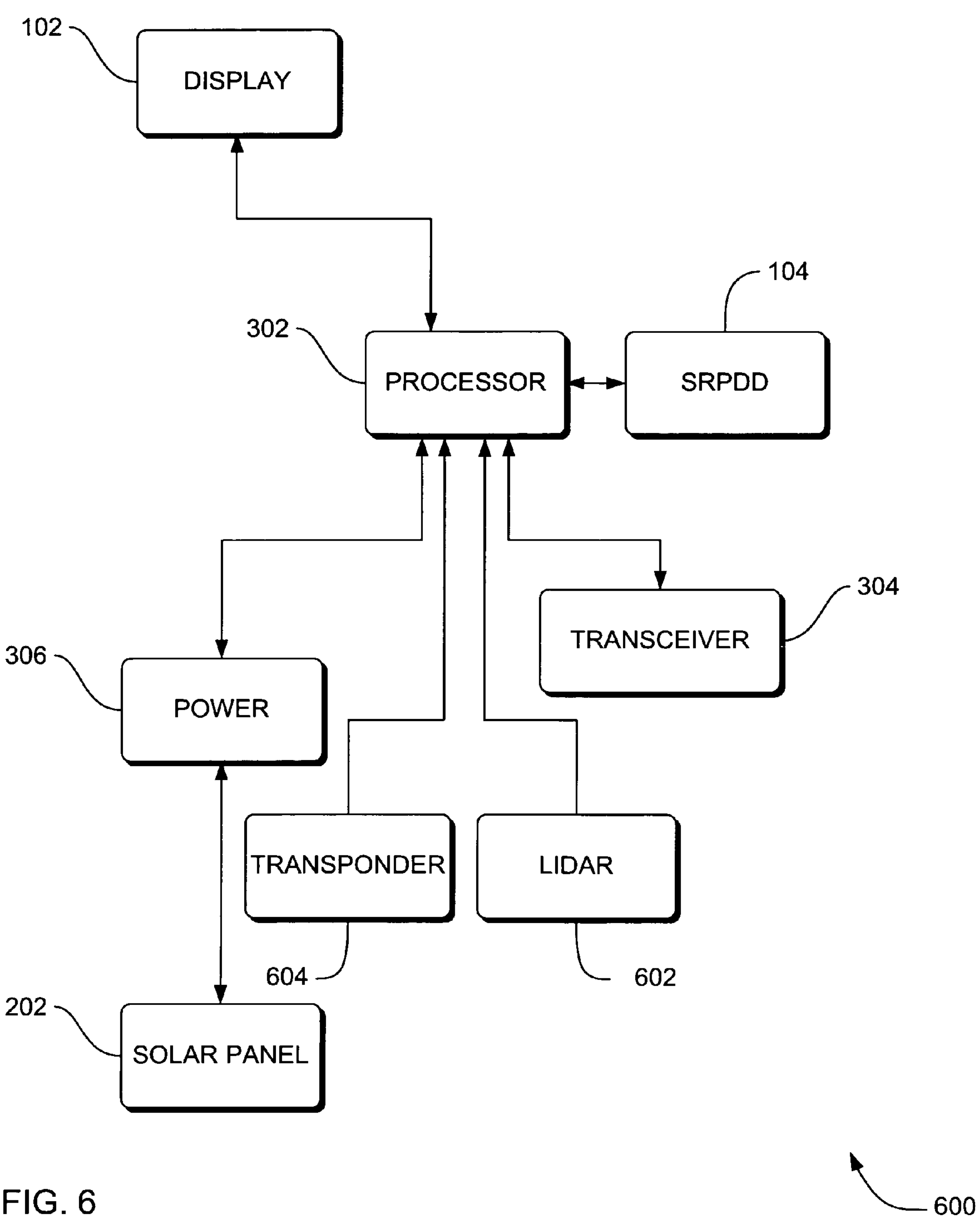
FIG. 6 is a schematic block diagram of a RIDAM unit according to an embodiment that includes a transponder and a LIDAR.

FIG. 6 is a schematic block diagram of a runway intersection display and monitor (RIDAM) unit 600 according to an embodiment that includes a transponder and a LIDAR. RIDAM unit 600 solves the need in the art to reduce additional involvement from air traffic control personnel.

The RIDAM unit 600 includes at least one alphanumeric display 102, at least one solar panel 202, at least one pair of stop/go signal lights 106 and 108, one or more short range proximity detection devices 104, a command and telemetry processor 302, a digital radio-frequency (RF) communications transceiver 304, and a power management unit 306.

In some embodiments, a movement confirmation signal, provided to the tower through an integrated short-range radar, LIDAR 602 or video unit, detects and transmits aircraft or vehicle position status and transmits a "watchdog" signal that periodically provides unit health and status updates to the tower. A receiver 604 may also be included for determining aircraft transponder code.

As shown in FIGS. 1-6 above, the RIDAM design is modular in function and form, so that optional features can be easily added to a RIDAM as needed without having to remove the RIDAM from service. For example, the proximity detection devices installed can include radar, lidar or video cameras, which can be interchanged or upgraded without any RIDAM hardware changes since a flexible data interface (such as Universal Serial Bus or Firewire I.E.E.E. 1394) can be implemented between components. Components that can be combined in various permutations include the alphanumeric display 102, the one or more solar panels 202, the short range proximity detection devices 104, the signal lights 106 and 108, the command and telemetry processor 302, the digital radio-frequency (RF) communications transceiver 304, the power management unit 306, the carrier-current communications component 402, the short range aviation band transmitter 502, the audio warning generator 504, LIDAR 602 and the transponder 604.

In regards to maintenance of RIDAMS 100-600, the modularity and portability inherent to the RIDAM design makes maintenance a relatively simple matter. When a failure occurs, ground personnel simply the entire unit with a spare until the defective unit can be repaired. Spare units can be quickly reprogrammed with the functionality of the failed unit using a handheld programming interface or automatically by transmitting program instructions from the central control console once the spare is installed.

In regards to reliability, of RIDAMS 100-600, reliability of all of the electronic components of the RIDAM units and their control console can be off-the-shelf products with established high reliability characteristics. In some embodiments, fault-tolerance can be designed into each subsystem so that each unit would continue to operate with backup components until it could be repaired or replaced.

In regards to safety issues, in some embodiment built-in safeguards provide fault detection and fault tolerance; modularity facilitates rapid repair or replacement; all wiring and electrical components can be made water-resistant to eliminate hazard of electrical shock and risk of weather-related failures; and each RIDAM can be designed and placarded with appropriate warning labels such that accidental or intentional abuse or misuse is avoided.

Figure 7:
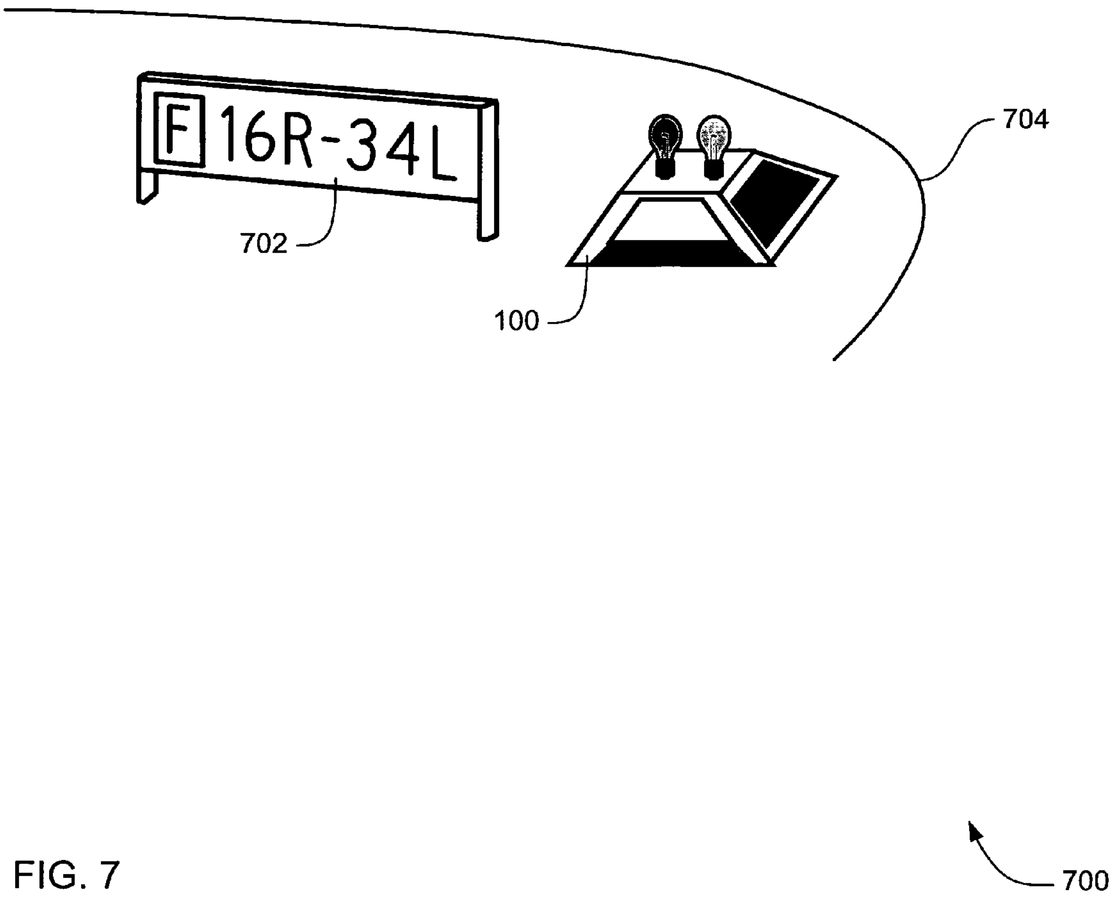
FIG. 7 is a diagram of a RIDAM unit in situ according to an embodiment.

FIG. 7 is a diagram of a runway intersection display and monitor (RIDAM) unit in situ 700 according to an embodiment. A RIDAM 100 is located in situ 700 in close proximity to a runway hold position sign 702; next to an outer perimeter of a runway 704.

The "chopped off" pyramid shape of the RIDAM 100 is particularly well-suited for placement adjacent to existing runway designator signs without obstructing visibility of the existing runway designator signs from the taxiways. The low profile of RIDAM 100 prevents from being a hazard to even the smallest low-wing aircraft, and the substantial weight (50+ pounds) of the RIDAM 100 allows the RIDAM 100 to remain motionless in extreme winds. In one scenario, a RIDAM is be positioned at each runway intersection; tower controllers are be able to selectively send stop/go signals and text messages to each of several aircraft awaiting clearance, and to independently confirm movements in response to instructions by means of the RIDAM's integrated proximity sensor.

Figure 8:
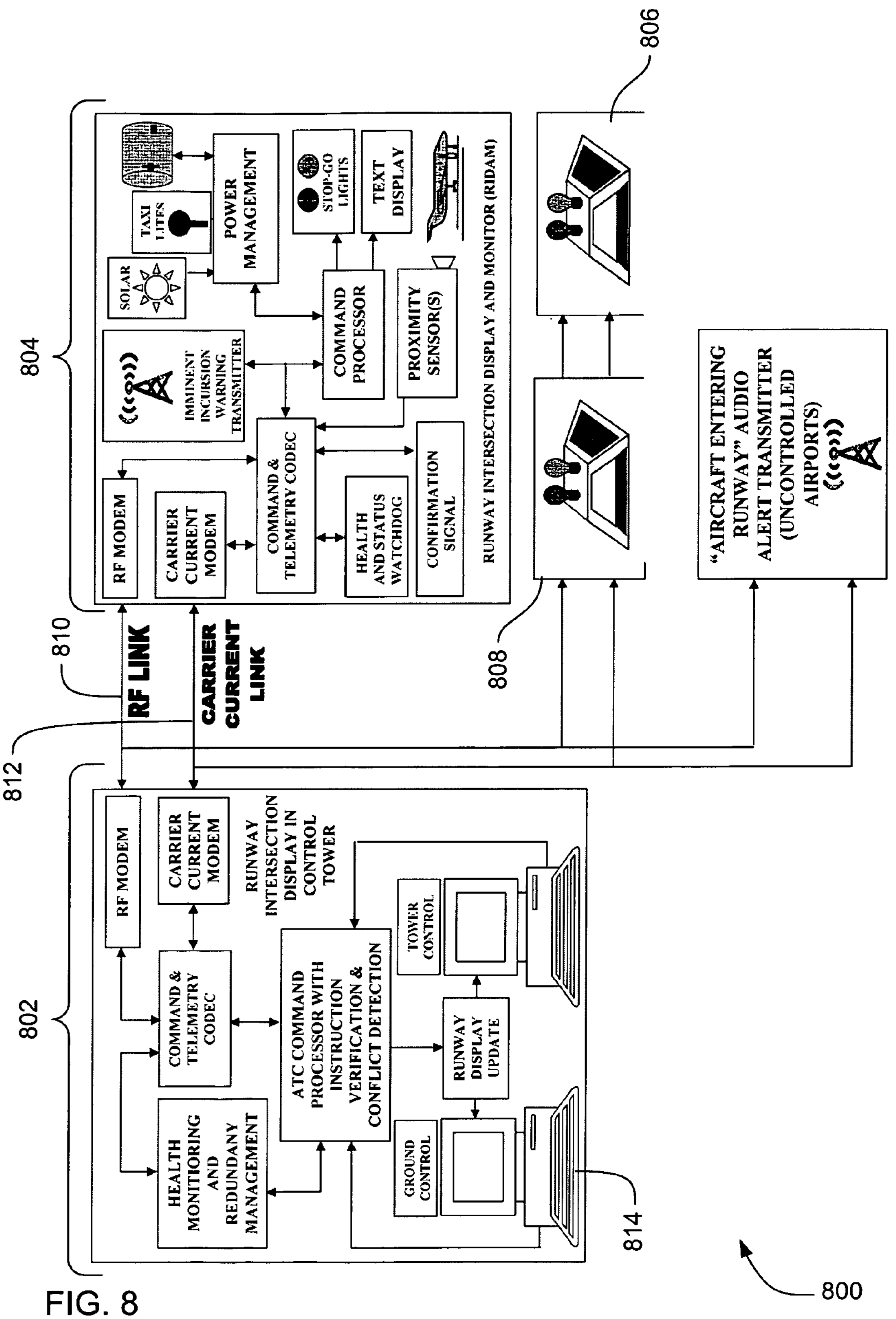
FIG. 8 is a block diagram of an airport taxi lighting system according to an embodiment.

FIG. 8 is a block diagram of an airport taxi lighting system 800 according to an embodiment. The airport taxi lighting system 800 solves the need in the art for an airport surface movement monitoring and signage systems that is versatile and that works without interaction from a ground controller and that does not require complex and expensive technologies or disruptive excavation activities. System 800 also solves the need in the art for all-weather day/night aircraft/vehicle position monitoring, unambiguous pilot/operator signaling and warning, and low-cost non-disruptive facilities installation and operation provided by a system that is designed for simplicity, with no expensive ground radar stations or sophisticated software algorithms involved and that reduces additional involvement from air traffic control personnel as well provides a portable and low cost runway incursion prevention system, in order to encourage widespread implementation of runway incursion detection systems and thus improve aircraft safety.

The airport taxi lighting system 800 includes two basic subsystems: a central communications unit 802, and a number of runway intersection display and monitor (RIDAM) units 804, 806 and 808.

The central communications unit (CCU) 802 provides an independent RF link 810 from each RIDAM to the tower (or other control center) using conventional over-the-air transmission (as shown in FIGS. 3, 4, 5 and 6) or alternatively, a carrier current communication link 812 through the existing taxiway lighting system (as shown in FIG. 4). The RF link 810 functions as an means of commanding and monitoring. The CCU 802 provides encryption and error detection and correction for all data to prevent accidental or intentional interference. The CCU 802 has an internal self-testing component to detect minor problems and alert ATC when corrective maintenance is needed before complete breakdown occurs. The CCU 802 also can change radio frequencies to avoid RF interference, or alternatively to switch to backup carrier current communications if such capabilities are installed.

For uncontrolled airports, one or more RIDAMS can be integrated with a ground traffic control system, such as central communications unit 802, that includes only universal communication (UNICOM) and automated surface observing system (ASOS) facilities. For example, aircraft approaching the uncontrolled airport which typically monitor the ASOS frequency to obtain weather information are also furnished with information regarding surface movements from the RIDAM(s). In particular, information regarding the surface movement of aircraft taxiing towards the departure end of the active runway and detected by the RIDAM(s) is reported through the ASOS frequency. The surface movement information is derived from the short range proximity detection devices (SRPDD) 104 embedded in each RIDAM, and processed by a central computer, such as computer 814, at the uncontrolled airport to determine direction of movement and number of active aircraft present.

For example, prior to entering a five miles radius around the airport pilots are expected to switch to the local UNICOM frequency, which is normally used to notify other pilots regarding position and intentions. On this frequency, the system provides an immediate short broadcast notifying pilots of aircraft entering the active runway. This broadcast is of great value in preventing potential collisions between landing and departing aircraft, especially at night or when visibility is limited (IFR or marginal VFR weather conditions). The system waits until pilots using the frequency have completed their transmissions before broadcasting notices of aircraft entering the active runway to avoid causing radio interference.

Figure 9:
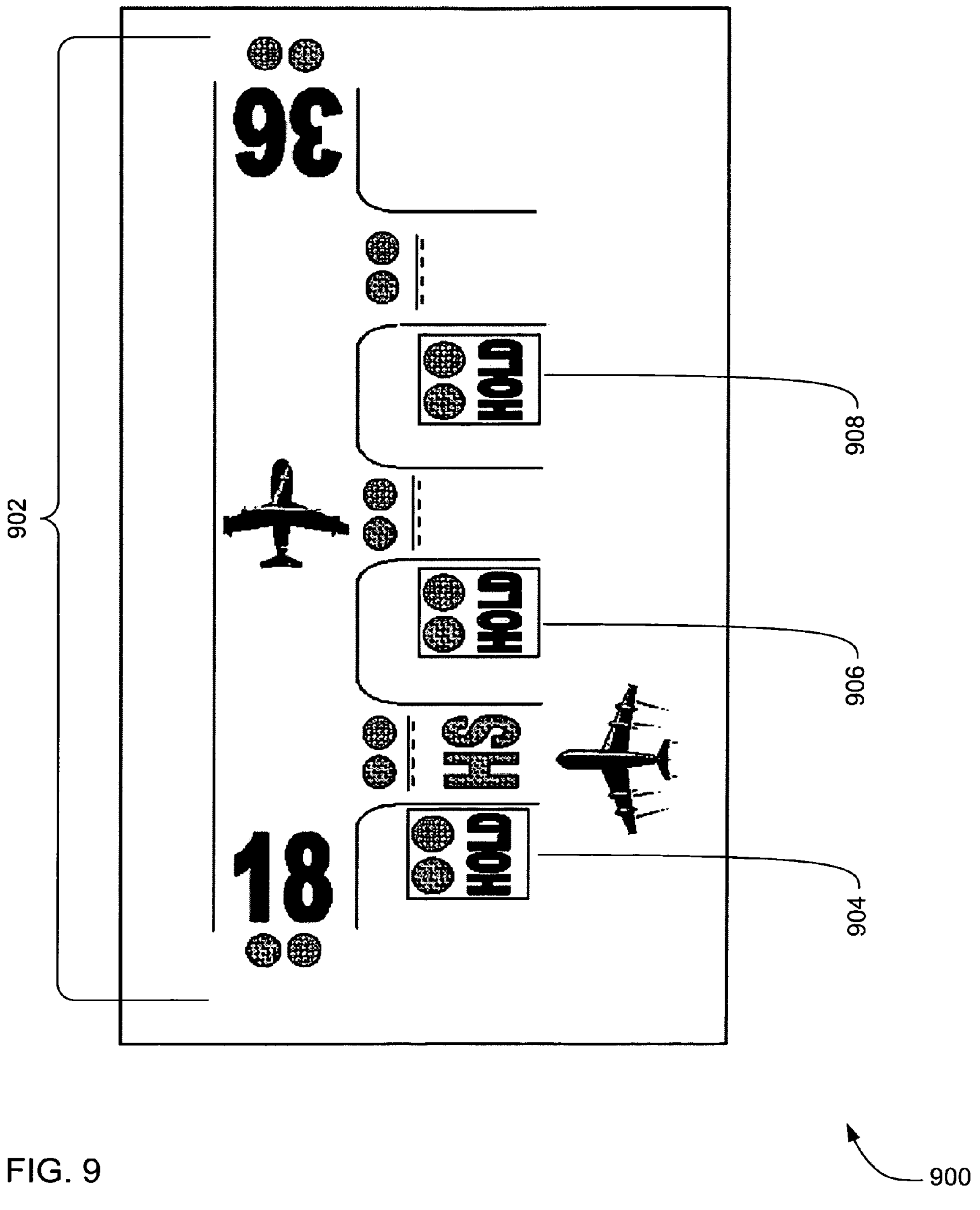
FIG. 9 is a block diagram of an air traffic control (ATC) user interface to communicate with a RIDAM unit according to an embodiment.

FIG. 9 is a block diagram of an air traffic control (ATC) user interface (ATCUI) 900 to communicate with a runway intersection display and monitor (RIDAM) unit according to an embodiment. ATCUI 900 solves the need in the art for an airport surface movement monitoring and signage systems that is versatile and that works without interaction from a ground controller and that does not require complex and expensive technologies or disruptive excavation activities. ATCUI 900 also solves the need in the art for all-weather day/night aircraft/vehicle position monitoring, unambiguous pilot/operator signaling and warning, and low-cost non-disruptive facilities installation and operation provided by a system that is designed for simplicity, with no expensive ground radar stations or sophisticated software algorithms involved and that reduces additional involvement from air traffic control personnel as well provides a portable and low cost runway incursion prevention system, in order to encourage widespread implementation of runway incursion detection systems and thus improve aircraft safety.

The ATCUI 900 includes a menu for an air traffic controller (or other user) to select the most commonly used aircraft/vehicle command instructions for alphanumeric display on each RIDAM. The ATCUI 900 also includes pushbutton icons to toggle the state of stop/go lights on the RIDAM units. The entire airport surface movement area can be displayed 902 along with a graphic depiction of each unit's status, 904, 906 and 908; or the controller may direct the ATCUI to zoom in on a particular runway, taxiway, or intersection. If the RIDAM units are equipped with video sensors, an image of any aircraft or vehicles present at the intersection may be displayed for identification purposes, automatically upon arrival or runway entry if desired. When installed at airports with multiple ground controller positions, the interface can be configured to display only the airport surface area which is the responsibility of a particular controller. The ATCUI also sends the tower information confirming the pilot's actions in response to the commanded directions, and a watchdog signal that informs the tower of the health and status of the lighting system.

Method Embodiments

In the previous section, apparatus of the operation of an embodiment was described. In this section, the particular methods performed by such an embodiment are described by reference to a flowchart.

Figure 10:
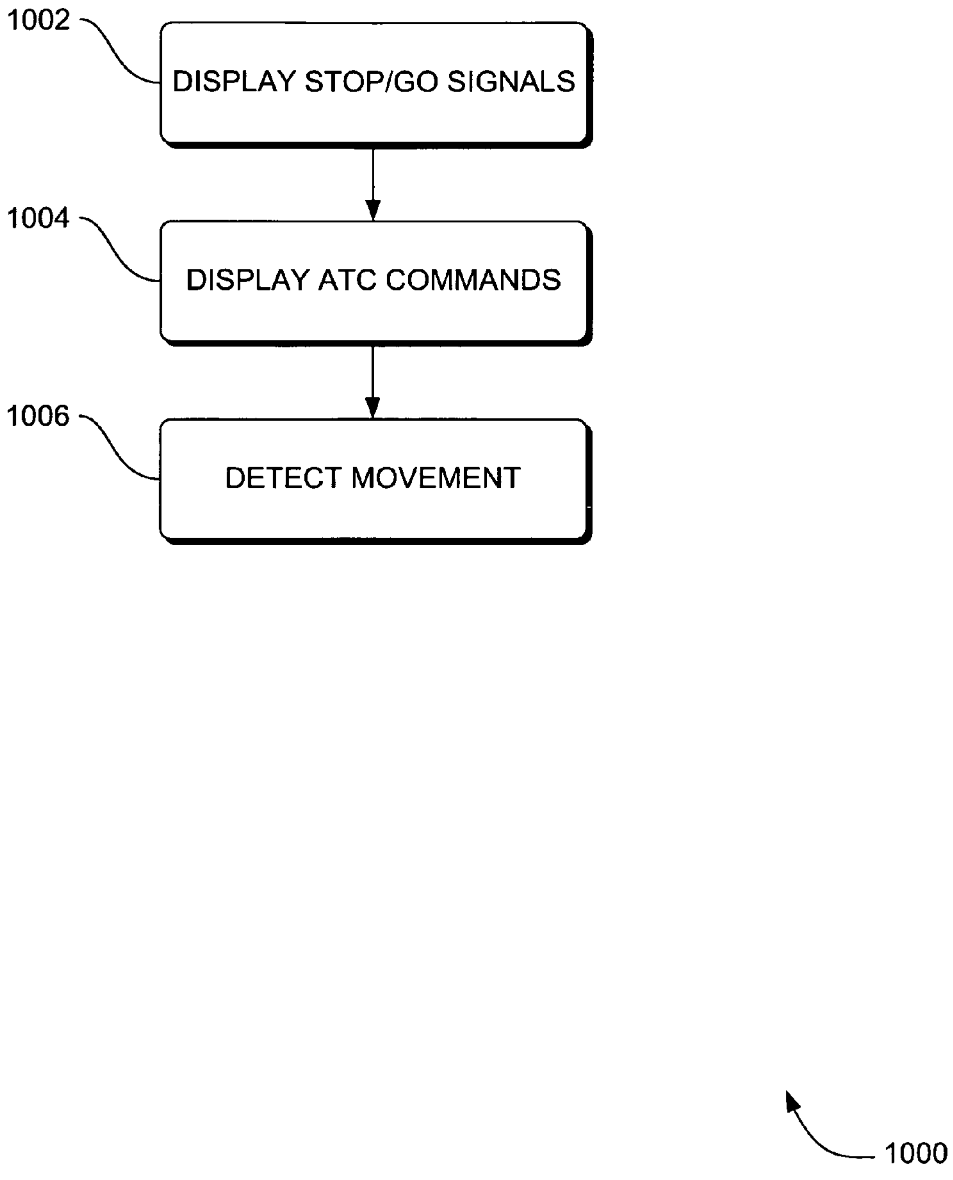
FIG. 10 is a flowchart of a method to reduce airport runway incursions through improved aircraft/vehicle positional awareness according to an embodiment.

FIG. 10 is a flowchart of a method 1000 to reduce airport runway incursions through improved aircraft/vehicle positional awareness according to an embodiment. Method 1000 solves the need in the art to reduce airport runway incursions. Method 1000 is performed by one device.

Method 1000 includes displaying 1002 Stop/Go signals, such as red/green signals.

Method 1000 also includes displaying 1004 at least one short alphanumeric traffic control (ATC), such as text messages, including HOLD, PROCEED, CLEARED and RETURN.

Method 1000 also includes detecting 1006 movement within a short range proximity. The actions of displaying 1002, displaying 1004 and detecting 1006 can be performed in any order. Method 1000 solves the need in the art to reduce airport runway incursions by providing more information to pilots and gathering more information for controller through improved aircraft/vehicle positional awareness.

Figure 11:
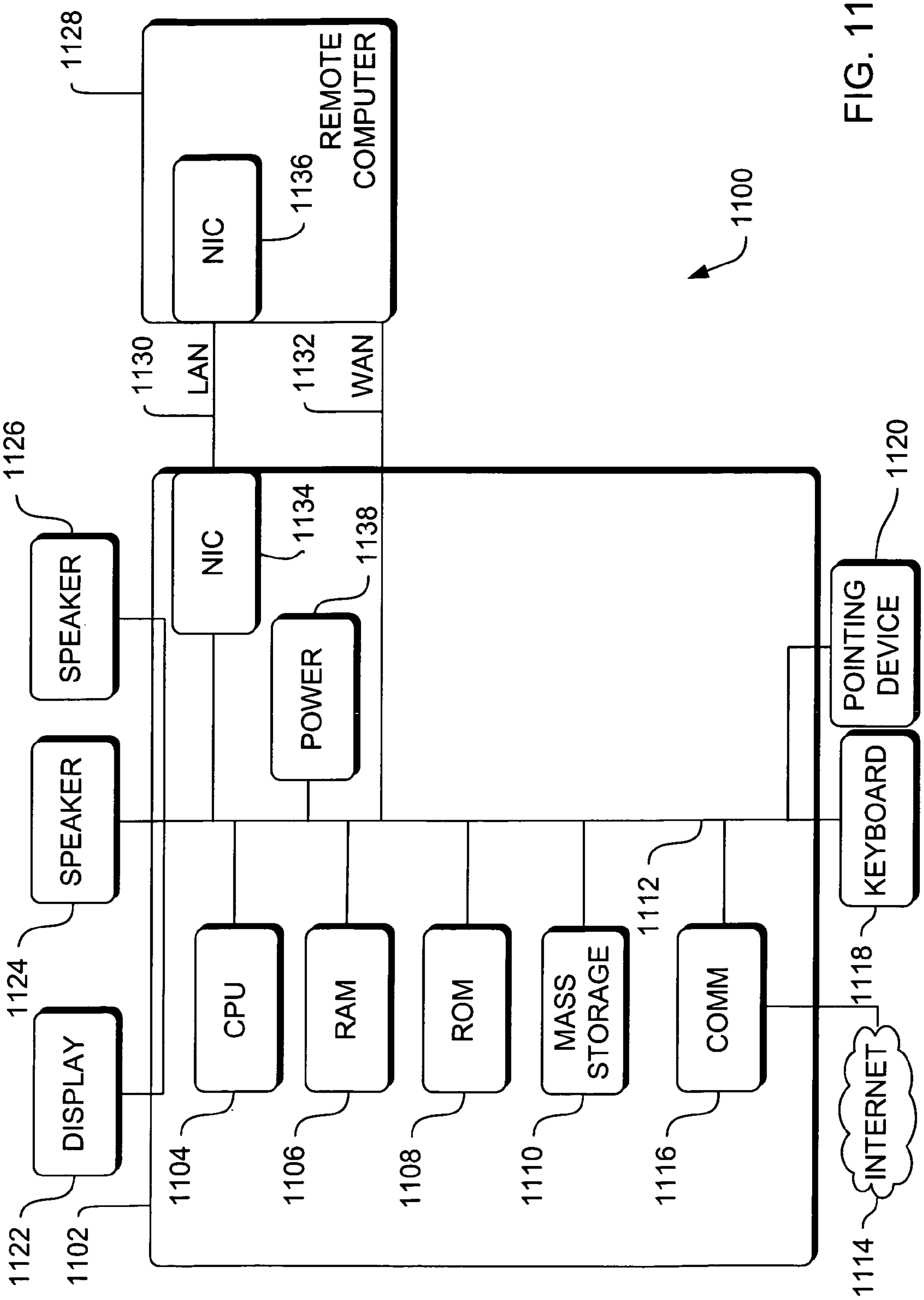
FIG. 11 is a block diagram of a hardware and operating environment in which different embodiments can be practiced.

In some embodiments, method 1000 is implemented as a computer data signal embodied in a carrier wave, that represents a sequence of instructions which, when executed by a processor, such as processor 1104 in FIG. 11, cause the processor to perform the respective method. In other embodiments, method 1000 is implemented as a computer-accessible medium having executable instructions capable of directing a processor, such as processor 1104 in FIG. 11, to perform the respective method. In varying embodiments, the medium is a magnetic medium, an electronic medium, or an optical medium.

Hardware and Operating Environment

FIG. 11 is a block diagram of a hardware and operating environment 1100 in which different embodiments can be practiced. The description of FIG. 11 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 1102 includes a processor 1104, commercially available from Intel, Motorola, Cyrix and others. Computer 1102 also includes random-access memory (RAM) 1106, read-only memory (ROM) 1108, and one or more mass storage devices 1110, and a system bus 1112, that operatively couples various system components to the processing unit 1104. The memory 1106, 1108, and mass storage devices, 1110, are types of computer-accessible media. Mass storage devices 1110 are more specifically types of nonvolatile computer-accessible media and can include one or more hard disk drives, floppy disk drives, optical disk drives, and tape cartridge drives. The processor 1104 executes computer programs stored on the computer-accessible media.

Computer 1102 can be communicatively connected to the Internet 1114 via a communication device 1116. Internet 1114 connectivity is well known within the art. In one embodiment, a communication device 1116 is a modem that responds to communication drivers to connect to the Internet via what is known in the art as a "dial-up connection." In another embodiment, a communication device 1116 is an Ethernet® or similar hardware network card connected to a local-area network (LAN) that itself is connected to the Internet via what is known in the art as a "direct connection" (e.g., T1 line, etc.).

A user enters commands and information into the computer 1102 through input devices such as a keyboard 1118 or a pointing device 1120. The keyboard 1118 permits entry of textual information into computer 1102, as known within the art, and embodiments are not limited to any particular type of keyboard. Pointing device 1120 permits the control of the screen pointer provided by a graphical user interface (GUI) of operating systems such as versions of Microsoft Windows®. Embodiments are not limited to any particular pointing device 1120. Such pointing devices include mice, touch pads, trackballs, remote controls and point sticks. Other input devices (not shown) can include a microphone, joystick, game pad, satellite dish, scanner, or the like.

In some embodiments, computer 1102 is operatively coupled to a display device 1122. Display device 1122 is connected to the system bus 1112. Display device 1122 permits the display of information, including computer, video and other information, for viewing by a user of the computer. Embodiments are not limited to any particular display device 1122. Such display devices include cathode ray tube (CRT) displays (monitors), as well as flat panel displays such as liquid crystal displays (LCD's). In addition to a monitor, computers typically include other peripheral input/output devices such as printers (not shown). Speakers 1124 and 1126 provide audio output of signals. Speakers 1124 and 1126 are also connected to the system bus 1112.

Computer 1102 also includes an operating system (not shown) that is stored on the computer-accessible media RAM 1106, ROM 1108, and mass storage device 1110, and is and executed by the processor 1104. Examples of operating systems include Microsoft Windows®, Apple MacOS®, Linux®, and UNIX®. Examples are not limited to any particular operating system, however, and the construction and use of such operating systems are well known within the art.

Embodiments of computer 1102 are not limited to any type of computer 1102. In varying embodiments, computer 1102 comprises a PC-compatible computer, a MacOS®-compatible computer, a Linux®-compatible computer, or a UNIX®-compatible computer. The construction and operation of such computers are well known within the art.

Computer 1102 can be operated using at least one operating system to provide a graphical user interface (GUI) including a user-controllable pointer. Computer 1102 can have at least one web browser application program executing within at least one operating system, to permit users of computer 1102 to access intranet or Internet world-wide-web pages as addressed by Universal Resource Locator (URL) addresses. Examples of browser application programs include Netscape Navigator® and Microsoft Internet Explorer®.

The computer 1102 can operate in a networked environment using logical connections to one or more remote computers, such as remote computer 1128. These logical connections are achieved by a communication device coupled to, or a part of, the computer 1102. Embodiments are not limited to a particular type of communications device. The remote computer 1128 can be another computer, a server, a router, a network PC, a client, a peer device or other common network node. The logical connections depicted in FIG. 11 include a local-area network (LAN) 1130 and a wide-area network (WAN) 1132. Such networking environments are commonplace in offices, enterprise-wide computer networks, intranets and the Internet.

When used in a LAN-networking environment, the computer 1102 and remote computer 1128 are connected to the local network 1130 through network interfaces or adapters 1134, which is one type of communications device 1116. Remote computer 1128 also includes a network device 1136. When used in a conventional WAN-networking environment, the computer 1102 and remote computer 1128 communicate with a WAN 1132 through modems (not shown). The modem, which can be internal or external, is connected to the system bus 1112. In a networked environment, program modules depicted relative to the computer 1102, or portions thereof, can be stored in the remote computer 1128.

Computer 1102 also includes power supply 1138. Each power supply can be a battery.

CONCLUSION

An airport signage and runway incursion detection system is described. Although specific embodiments are illustrated and described herein, it will be appreciated by those of ordinary skill in the art that any arrangement which is calculated to achieve the same purpose may be substituted for the specific embodiments shown. This application is intended to cover any adaptations or variations. For example, although described in aircraft terms, one of ordinary skill in the art will appreciate that implementations can be made in other transportation systems that provide the required function.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future airport signage and new runway incursion detection systems.

The terminology used in this application is meant to include all airport environments and alternate technologies which provide the same functionality as described herein.

We claim:

1. An apparatus to display air traffic control messages and monitor movement at airport surface pathways, the apparatus comprising:

a runway intersection display and monitor (RIDAM) comprising:

electrical circuitry;

at least one alphanumeric display being electrically coupled to the electrical circuitry;

at least one stop/go signal light being electrically coupled to the electrical circuitry;

at least one short range proximity detection device operable to detect movement within a short range proximity and being electrically coupled to the electrical circuitry; and a power management unit being electrically coupled to the electrical circuitry and a ground traffic control system integrated with the RIDAM, the ground traffic control system including a universal communication (UNICOM) facility and an automated surface observing system (ASOS) facility.

2. The apparatus of claim 1, wherein the RIDAM further comprises:

a pyramid shape.

3. The apparatus of claim 1, wherein the RIDAM further comprises:

at least one digital radio-frequency (RF) communications transceiver being electrically coupled to the electrical circuitry.

4. The apparatus of claim 3, wherein the digital radio-frequency (RF) communications transceiver further comprises:

at least one digital radio-frequency (RF) communications transceiver being operable to transmit and receive encrypted signals.

5. The apparatus of claim 3, wherein the digital radio-frequency (RF) communications transceiver further comprises:

at least one digital radio-frequency (RF) communications transceiver being operable to detect persistent interference with another transceiver and being operable to coordinate a mutual frequency change with the other transceiver.

6. The apparatus of claim 3, wherein the digital radio-frequency (RF) communications transceiver further comprises:

at least one digital radio-frequency (RF) communications transceiver operable to transceive in spread-spectrum and pulse code modulation.

7. The apparatus of claim 3, wherein the digital radio-frequency (RF) communications transceiver further comprises:

conventional cellular phone integrated circuits.

8. The apparatus of claim 3, wherein the digital radio-frequency (RF) communications transceiver further comprises:

conventional cable modem integrated circuits.

9. The apparatus of claim 1, wherein the at least one alphanumeric display further comprises:

at least one alphanumeric display that is operable to display air traffic control text messages, the air traffic control text messages further comprising HOLD, PROCEED, CLEARED and RETURN.

10. The apparatus of claim 1, wherein the at least one stop/go signal light further comprises:

at least one red/green light.

11. The apparatus of claim 1, wherein the electrical circuitry further comprises:

at least one processor.

12. The apparatus of claim 11, wherein the processor further comprises:

at least one command and telemetry processor.

13. The apparatus of claim 1, wherein the RIDAM further comprises:

at least one solar panel being electrically coupled to the electrical circuitry; and at least one backup battery being electrically coupled to the electrical circuitry.

14. The apparatus of claim 1, wherein the RIDAM is operable to receive power from an existing external power system.

15. An air traffic control system comprising:

a runway-intersection-display-and-monitor comprising:

electrical circuitry;

at least one alphanumeric display being electrically coupled to the electrical circuitry; and at least one short range proximity detection device operable to detect surface movement of aircraft taxiing towards a departure end of an active runway and being electrically coupled to the electrical circuitry;

at least one stop/go signal light being electrically coupled to the runway-intersection-display-and-monitor and mounted on top of the runway-intersection-display-and-monitor; and a ground traffic control system integrated with the runway-intersection-display-and-monitor, the ground traffic control system including a universal communication facility and an automated surface observing system facility that is operable to report information regarding the surface movement of aircraft taxiing towards the departure end of the active runway.

16. The system of claim 15 further comprising a digital radio-frequency communications transceiver that further comprises:

at least one digital radio-frequency communications transceiver being operable to transmit and receive encrypted signals.

17. The system of claim 16, wherein the at least one alphanumeric display further comprises:

at least one alphanumeric display that is operable to display air traffic control text messages, the air traffic control text messages further comprising HOLD, PROCEED, CLEARED and RETURN.

18. The system of claim 16, wherein the at least one stop/go signal light further comprises:

at least one red/green light.

19. The system of claim 16, wherein the runway-intersection-display-and-monitor further comprises:

at least one solar panel being electrically coupled to the electrical circuitry; and at least one backup battery being electrically coupled to the electrical circuitry.

20. An air traffic control system comprising:

a runway-intersection-display-and-monitor comprising:

electrical circuitry;

at least one alphanumeric display being electrically coupled to the electrical circuitry; and at least one short range proximity detection device operable to detect movement within a short range proximity and being electrically coupled to the electrical circuitry;

at least one stop/go signal light being electrically coupled to the runway-intersection-display-and-monitor and mounted on top of the runway-intersection-display-and-monitor; and a ground traffic control system integrated with the runway-intersection-display-and-monitor, the ground traffic control system including a universal communication facility and an automated surface observing system facility.

21. The system of claim 20, wherein the runway-intersection-display-and-monitor further comprises:

a pyramid shape.

22. The system of claim 21, wherein the runway-intersection-display-and-monitor further comprises:

at least one digital radio-frequency communications transceiver being electrically coupled to the electrical circuitry.

23. The system of claim 22, wherein the digital radio-frequency communications transceiver further comprises:

at least one digital radio-frequency communications transceiver being operable to transmit and receive encrypted signals.

24. The system of claim 21, wherein the digital radio-frequency communications transceiver further comprises:

at least one digital radio-frequency communications transceiver being operable to detect persistent interference with another transceiver and being operable to coordinate a mutual frequency change with the other transceiver.

* * * * *